May 15, 1945. H. D. COULBOURN 2,376,124
VALVE
Filed Nov. 15, 1943
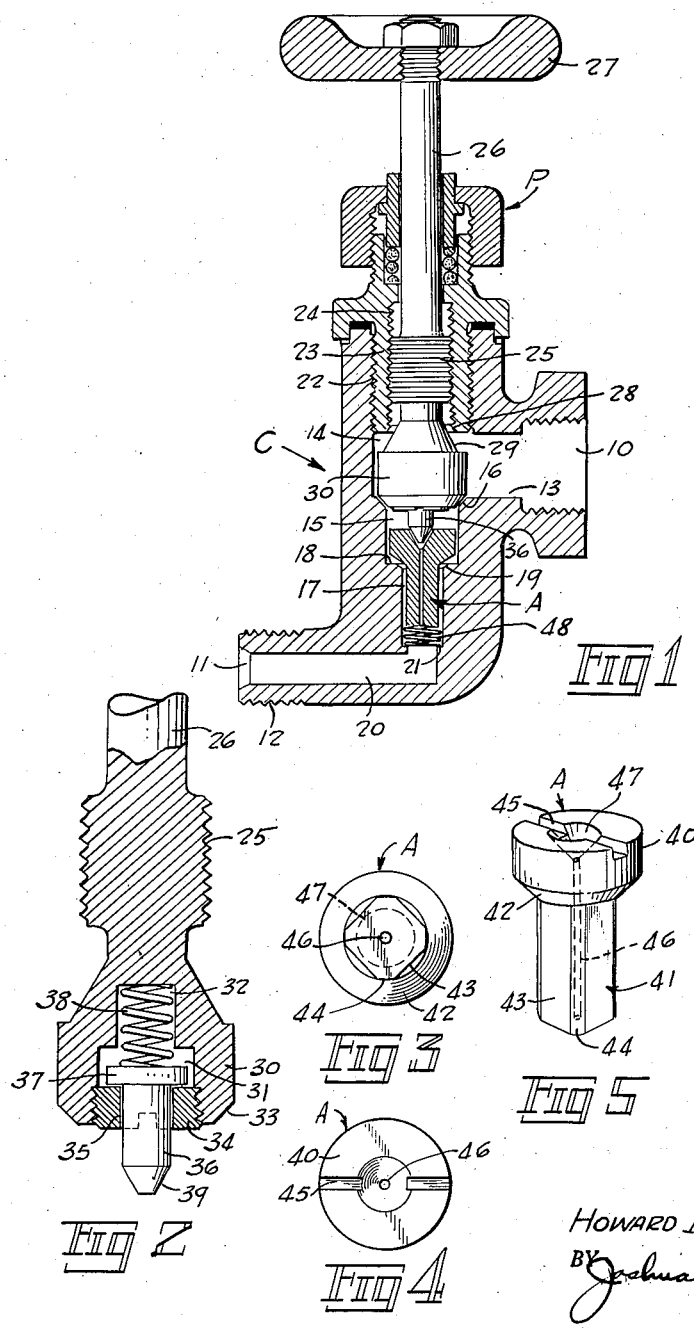
INVENTOR.
HOWARD D. COULBOURN
BY Joshua R. H. Potts
ATTY.

Patented May 15, 1945

2,376,124

UNITED STATES PATENT OFFICE 2,376,124

VALVE

Howard D. Coulbourn, Wynnewood, Pa.

Application November 15, 1943, Serial No. 510,295

1 Claim. (Cl. 277—29)

This invention relates to valves and is concerned primarily with the so-called "safety valves" which are included in gas lines for the purpose of automatically discontinuing the flow of gas should the line be broken or otherwise damaged.

It is now common practice to supply gas to a burner or torch under pressure. This gas has been delivered through a safety valve which remains open when a required condition of balanced pressures on both sides of the valve obtains. However, if this balance is disturbed, such as by a break in the flexible conduit which ordinarily connects the safety valve with the burner, the safety valve automatically closes. It has also been generally recognized as necessary to include in the line which delivers the gas a stop valve which may be manually operated to positively shut off the flow of gas, such as during periods of nonuse. Heretofore, these stop valves have been separate and removed from the safety valves aforesaid.

With the foregoing conditions in mind, this invention has in view, as its foremost object, the provision of a combination safety and stop valve. Stated in another way, the invention has as an object the provision of a valve which performs both functions of the safety valve and the functions of the stop valve.

In carrying out this idea, a valve casing of conventional design is employed. This casing includes a gas intake and a gas outlet. Between the intake and the outlet is a passage terminating at one end in a shoulder that is ground down to provide a valve seat. A plug is designed to fit in this passage and is enlarged at one end to form a conical ring complemental to the said seat. A spring means is associated with this plug and tends to keep the conical surface thereof upraised from the seat. However, pressure of gas from the intake may, under certain conditions, be effective on the enlarged head to overcome the influence of the spring means and seat the conical surface on the valve seat.

A particularly important object of the invention is the provision, in a valve assembly of the character outlined in the preceding paragraph, of a plug which is formed with a weep hole that establishes communication between opposite sides of the enlarged head and which terminates in a valve seat. A valve stem is provided for cooperation with the plug, and this stem is formed at one end as a valve which is complemental to the seat in the plug. The gist of the present invention lies in the fact that this stem may perform the dual function of closing the weep hole and positively causing the head of the plug to be seated on its complemental seat in the valve casing.

A somewhat more detailed object of the invention is the provision, in a valve mechanism of the character aforesaid, of a conical seat for closing the weep hole, and a complemental conical needle point on the stem.

There may be occasions when dirt or foreign matter will accumulate on the seat in the casing and thus interfere with accurate seating of the plug head. Another highly important object of the invention is the provision in a valve of this type of means for accurately insuring that the flow of gas between the intake and the outlet will be shut off even though the head of the plug be only partially seated. In attaining this end, the casing is formed with another valve seat between the intake and the valve seat which cooperates with the head of the plug. The valve stem is provided with a ring which is adapted for cooperation with this additional seat, and which ring will be properly seated even though the head of the plug be unseated.

More in detail, the invention has as an object the provision of a valve stem, the lower end of which is formed as a conical ring complemental to the seat in the valve casing. The needle point, made as a separate entity from the stem, is adapted for cooperation with the seat in the plug. Expensive spring means is associated with the stem and needle point, and this spring means may be overcome after the needle point is seated in the plug head to permit further downward movement, so as to insure proper seating of the valve stem ring on its seat in the casing.

Various other more detailed objects and advantages of the invention, such as arise in connection with carrying out the above noted thoughts in a practical embodiment, will in part become apparent and in part be hereinafter stated as a description of the invention proceeds.

The invention, therefore, comprises a combination safety and stop valve, of the character above outlined, and which includes secondary or supplementary valve elements for insuring that the flow of gas through the valve will be stopped, even though the stop valve be improperly or inaccurately seated.

For a full and more complete understanding of the invention, reference may be had to the following description and accompanying drawing, wherein:

Figure 1 is a vertical section through a valve designed in accordance with the precepts of this invention;

Figure 2 is an enlarged detailed sectional showing through one end of the valve stem;

Figure 3 is a bottom plan view of the plug per se; while

Figure 4 is a top plan view of the plug; and

Figure 5 is a detailed perspective of the plug.

Referring now to the drawing, wherein like reference characters denote corresponding parts, and first more particularly to Figure 1, a valve casing is referred to in its entirety by the reference character C. The casing C includes a gas intake represented at 10 and an outlet at 11. The intake 10 is adapted to be connected to a suitable source of supply of gas under pressure, such as indicated by the internally threaded nipple. Likewise, the outlet 11 is adapted to be connected to a flexible conduit such as a rubber hose by the external thread shown at 12. Ordinarily, a burner or torch (not illustrated) will be operatively connected to the free end of this flexible conduit.

Extending inwardly from the intake 10 is a horizontal cylindrical passage 13 which communicates with the main central vertical bore of the valve casing which is depicted at 14. Communicating with this bore 14 is a bore 15 of restricted diameter. Between the bores 14 and 15 is a conical shoulder 16 that is ground down to provide a valve seat, the function of which will later be described in detail. Communicating with the bore 15 is another bore 17 of still further diminished diameter. Between the bores 15 and 17, there is a shoulder 18, the corner of which is ground down to provide a valve seat 19. At its lower end, the bore 17 communicates with a horizontal passage 20 that extends to the outlet 11. Between this passage 20 and the bore 17 is a ring-like shoulder 21 which is adapted to support a spring, as will be later pointed out.

The upper portion of the main bore 14 is threaded as indicated at 22, and screwed into this threaded bore 22 is a sleeve 23 which is both internally and externally threaded. The internally threaded bore of the sleeve 23 is indicated at 24 and receives the threaded portion 25 of a valve stem 26. The upper end of the valve stem 26 carries an operating member such as the handle 27.

There are many old and well-known arrangements for packing the stem 26 in the sleeve 23. Inasmuch as the particular packing employed is not a part of this invention, the packing assembly is merely referred to in its entirety by the reference character P, and is intended to be only illustrative of one packing arrangement which may be employed. The purpose of this packing, of course, is to prevent any leakage of gas past the valve stem 26, and this prevention is further enhanced by a conical valve seat 28 formed at the lower end of the bore 24 of the sleeve 23. The valve stem 26 is formed with a conical surface 29 that is complemental to the seat 28, and which, when seated thereon, prevents the entrance of gas into the bore 24.

Referring now more particularly to Figure 2, the lower end of the valve stem 26 is shown as taking the form of a ring 30 that encloses a recess 31 which, in turn, is counterbored as indicated at 32. The external corner of the ring 30 is ground off to provide a conical valve surface 33 that is complemental to the valve seat 16 and which is intended to be seated thereon under certain conditions. The outer portion of the recess 31 is threaded and screwed thereinto is a ring plug 34 having a central opening 35. A needle member 36 extends through this opening 35 in the ring plug 34, and the inner end of this needle member 36 is enlarged to provide a head 37. An expansion spring 38 is positioned in the counterbore 32 and engages the bottom of this counterbore at one end and the head 37 at the other. The outer free extremity of the needle member 36 is provided with a conical valve surface represented at 39.

Referring now more particularly to Figures 3, 4 and 5, and wherein is depicted the plug member, which constitutes the most highly essential part of this invention. This plug is referred to in its entirety by the reference character A and is shown as comprising a head 40 and a shank 41. Between the head 40 and the shank 41 is a conical shoulder 42 that is complemental to the valve seat 19. The shank 41 has flat sides 43 joined by rounded corners 44, and these flat sides provide adequate space around the plug in the bore 17 for the passage of gas.

The head 40 is formed with a cross kerf 45. A weep hole 46 extends vertically throughout the shank and head of the plug A. In the head, this weep hole 46 terminates in a conical valve seat 47 that is complemental to the conical point 39 on the needle 36.

It will be noted that the plug A is positioned with the head 40 in the bore 15, while the shank 41 is located in the bore 17. An expansion spring 48 is located beneath the bottom end of the shank 41 and bears against the shoulder 21. The mode of operation of the above described valve mechanism may be outlined as follows: When the handle 27 is operated to rotate the stem 26 to cause the valve to assume an open position, the surface 29 on the stem engages the seat 28 to seal off any possibility of gas escaping up past the valve stem. In this open position, the conical surface 33 of the ring 30 is spaced from its seat 16, thus permitting the flow of gas past this seat. When the valve is first opened, it will be assumed that there is a source of supply of gas under pressure in communication with the intake 10. For exemplary purposes, this gas may be said to have a pressure of 30 lbs. When the valve is first opened, the pressure at the outlet 11 will be that of the atmosphere, namely, 14.7 lbs. Thus, the pressure of gas on the intake side is initially effective to keep the conical surface 42 of the head 41 seated on the valve seat 19, but, upward movement of the valve stem 26 also withdraws the needle point 39 from its seat 47. Thus, the weep hole 46 is opened and gas passes from the intake 10 through this weep hole to the under side of the head 40 of the plug. As this weeping continues, the differential in pressures on opposite sides of the head 40 is gradually equalized, and, when a condition of balance is substantially obtained, the spring 48 is effective to raise the plug A and lift the conical surface 42 from its seat 19.

The fully open condition is now established and gas will pass from the intake 10 through the valve and out through the outlet 11 to the burner, torch or the operating instrumentalities. Should the flexible line be cut, or for any other reason should the pressure of gas on the outlet side 11 be rapidly diminished, the valve will function as a safety valve as the gas pressure on the intake side 10 will quickly move the plug A into closing position. The only gas which will be lost will be that which passes through the weep hole 46, and, when there is no confining condition on the outlet side, there can be no building up of pressure to balance that on the intake side.

When it is desired to manually operate the valve to completely shut off the flow of gas, such as during periods of nonuse, the handle 27 is availed of to move the stem 26 downwardly. This causes the needle point 39 to engage the seat 47 and close the weep hole 46. Further downward movement causes the plug A to be moved downward against the influence of the spring 48, whereupon the conical surface 42 engages its seat 19. Ordinarily, this will be sufficient to establish a completely closed condition. However, there is a possibility that dirt or foreign matter might collect on this seat 19 which would result in an inaccurate or improper seating. Even should this take place, the manner in which the needle member 36 is carried by the stem 26 permits of a further downward movement of the stem against the influence of the spring 38, so as to cause the conical surface 33 to engage its seat 16 in the casing. Thus, the gas will be cut off, even though the plug be improperly seated.

While a preferred specific embodiment of the invention is hereinbefore set forth, it is to be clearly understood that the invention is not to be limited to the exact constructions illustrated and described, because various modifications of these details may be provided in putting the invention into practice, within the purview of the appended claim.

What is claimed is:

In a valve of the character described, a valve casing having bores of different diameters with a shoulder therebetween formed as a valve seat, a plug having a head positioned in the bore of larger diameter and a shank in the bore of smaller diameter, with said shank in sliding engagement with the wall of said smaller bore, said shank and said wall cooperating to define a passageway communicating between said valve seat and the lower end of said shank said plug being formed with a valve surface complemental to said valve seat and a longitudinal weep hole extending through said shank and head and terminating in a valve seat in said head, spring means normally maintaining said valve surface spaced from said valve seat between the bores, a valve stem operatively mounted in said casing and a needle member carried by said stem and having a point complemental to the valve seat at the end of said weep hole, said valve stem being operable to move said needle point into sealing position and cause said plug to move against the influence of said spring and seat said valve surface on the seat between said plugs.

HOWARD D. COULBOURN.